INVENTORS.
Agustin J. Syrovy,
Teno Iavelli.
BY
Harness & Harris
ATTORNEYS.

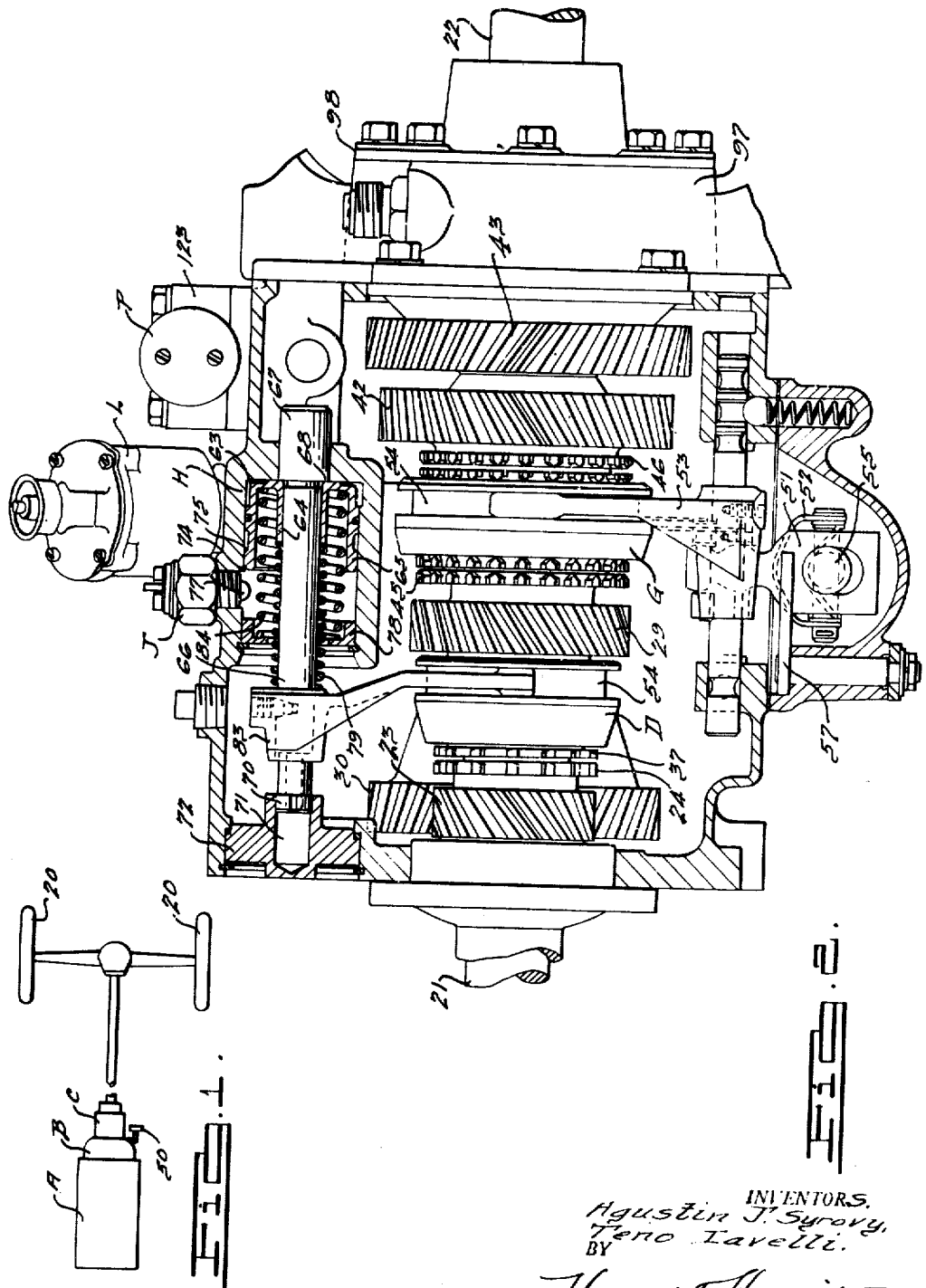

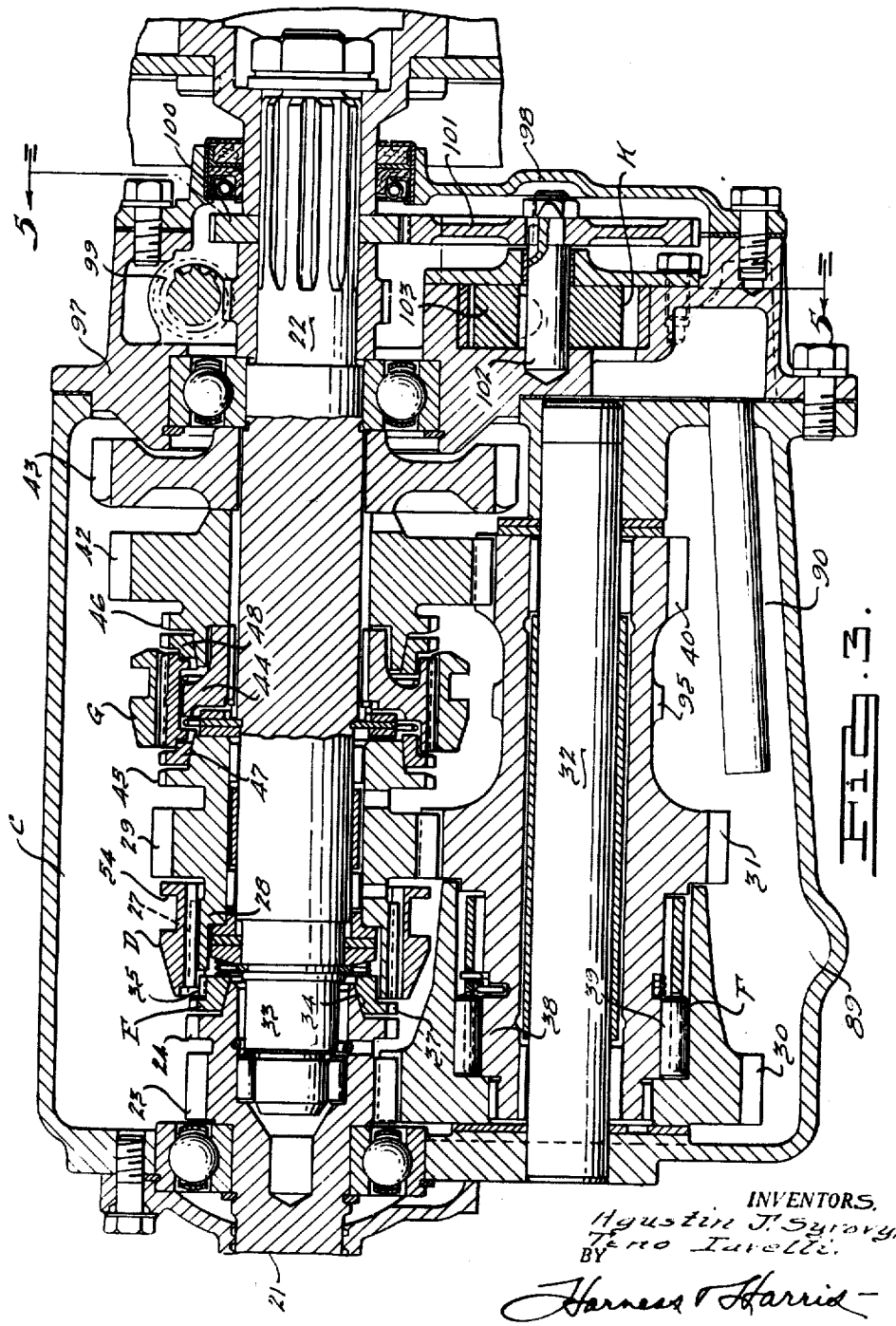

Dec. 6, 1949     A. J. SYROVY ET AL     2,490,604
POWER TRANSMISSION
Filed May 31, 1945     6 Sheets-Sheet 4

INVENTORS.
Agustin J. Syrovy,
Ferenc Iavelli.
BY
Harness & Harris
ATTORNEYS.

Dec. 6, 1949  A. J. SYROVY ET AL  2,490,604
POWER TRANSMISSION
Filed May 31, 1945  6 Sheets-Sheet 6
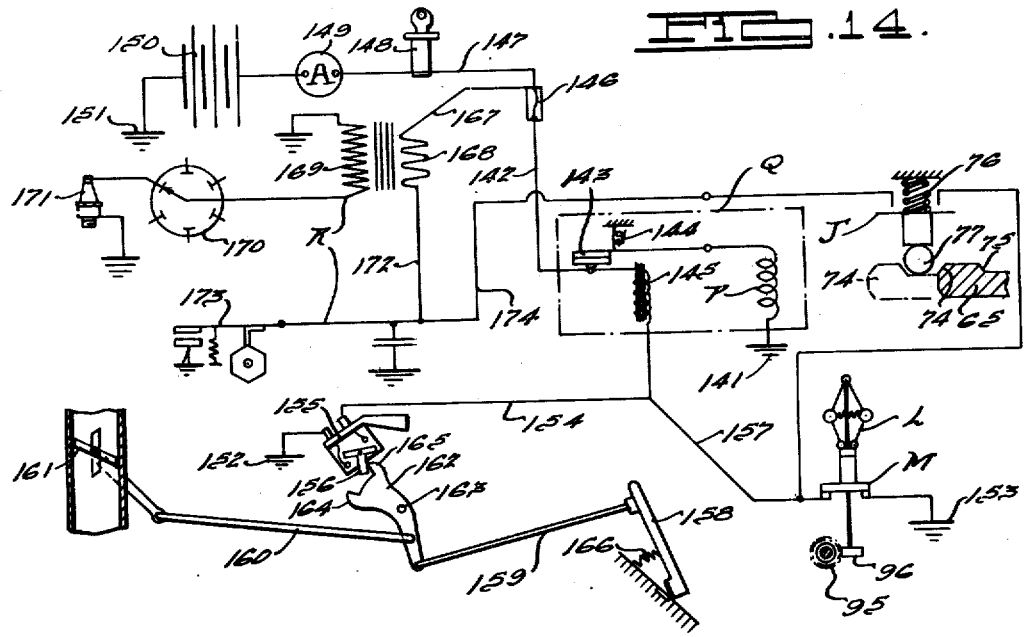
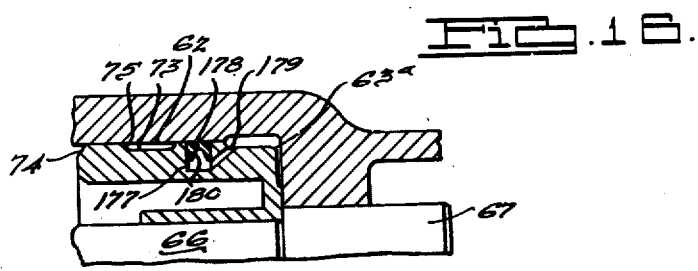
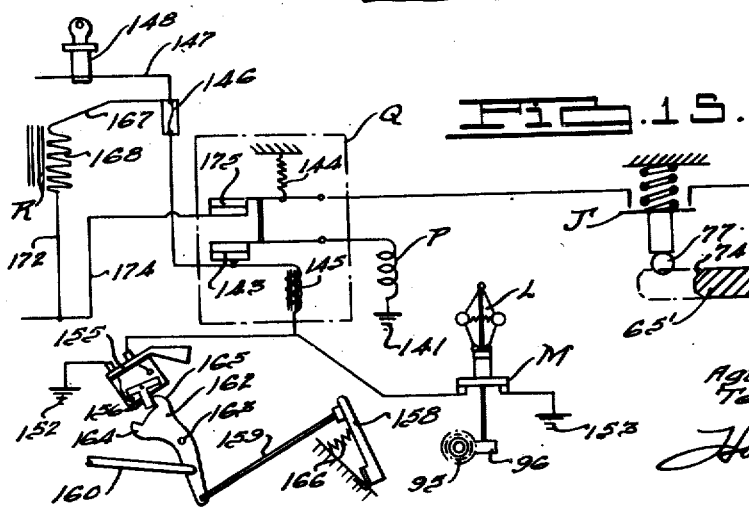
INVENTORS.
Agustin J. Syrovy,
Tero Iavelli.
BY
Harness Harris
ATTORNEYS.

Patented Dec. 6, 1949

2,490,604

UNITED STATES PATENT OFFICE 2,490,604

POWER TRANSMISSION

Augustin J. Syrovy and Teno Iavelli, Detroit, Mich., assignors to Chrysler Corporation, Highland Park, Mich., a corporation of Delaware Application May 31, 1945, Serial No. 596,842

15 Claims. (Cl. 74—472)

This invention relates to power transmissions and refers more particularly to improvements in transmissions of the type adapted to transmit power from the engine to the driving wheels of motor vehicles.

In transmissions of the automatic or semi-automatic types, prior to our invention, servo-motor means of the pressure fluid type has been provided for power manipulative control of speed ratio change. Such servo-motors often employ oil or the equivalent as the operating medium and are known generally as "hydraulically" operated transmissions. In arrangements of this type it has been customary to provide a valve for the control of the oil to the servo-motor and usually the valve is itself operated by a motor such as a solenoid which lends itself to convenient control by governor, kickdown switch, dash switch, and other controls. In order to properly control the oil pressure supply to the servo-motor and venting the same, it has been deemed necessary as a practical matter to provide porting of generous capacity which in turn requires a relatively long valve stroke of around ½ inch, by way of example. In order to quickly operate the type of valve required over a relatively long stroke, the solenoid for actuating the valve must be relatively large as it must naturally have sufficient capacity to do the work required. This results in a requirement for relatively high current, complicated wiring control circuit, and relatively high cost.

One object of our invention is to overcome the aforesaid objections by providing a control wherein the power required to operate the valve is largely derived from the pressure of the fluid operating medium.

Another object is to provide a control in which a very small size solenoid of small current requirement and small stroke in the order of around ⅛ inch, for example, is so arranged as to control a fluid servo-motor without sacrificing the desired generous size valve porting and quick valve operation.

A further object is to provide a control in which the electrical system for controlling the solenoid is of a simplified arrangement being required to carry only a relatively small current.

In carrying out our invention we provide what may be termed a pilot valve of relatively low inertia and small stroke, this pilot valve serving to control fluid pressure operation of a main valve which may have the desired generous porting and as large a size and stroke as desired without penalizing the solenoid. Such arrangement lends itself to quantity manufacture as it is not sensitive to minor variations as is the case where attempts are made to control the porting with a short stroke main valve operated directly from the solenoid. Furthermore, with our arrangement the solenoid is not called upon to overcome sticking of the main valve as is experienced in cold weather.

In order to minimize the work required by the solenoid whereby the solenoid may be very small in size and of very small current requirements, we have provided a pilot valve which is balanced at all times with respect to the pressure of the oil to which it is subjected. In this manner the oil pressure does not operate on the solenoid plunger and the only work required of the solenoid is to move the pilot valve through its very small stroke and to overcome the pressure of a relatively light spring for return of the solenoid and pilot valve parts. A further feature of our invention resides in the provision of a simple and effective arrangement of overcoming any tendency of the pilot valve to stick against operation by the solenoid. Thus, we have provided a hammer-blow effect between the solenoid operator and the pilot valve by reason of a small gap or clearance between these parts.

An additional object is to provide a pilot valve and main valve system in which both valves are balanced against the oil pressure and wherein both valves are of simplified low cost construction in which ported valve sleeves are not necessary.

Another object is to provide a transmission control system in which the time for affecting downshift is minimized over prior known devices. Contributing to the attainment of this object are our improved arrangement of short stroke balanced pilot valve, rapid venting control operation of the pilot valve for effecting venting control by the main valve, and an improved arrangement for rapid supply and relief of the pressure fluid to and from the servo-motor which controls change speed functions of the transmission.

Another object is to provide an improved drive arrangement for the pressure fluid supply pump such that the pump may be readily inspected and serviced if desired, the speed of the pump drive may be varied, and the pump caused to be efficiently operated in supplying oil at the required pressure even at relatively low vehicle speeds.

Another object of our invention is to provide a simplified and improved control system for a transmission of the step-up and step-down type wherein ratio changes are produced by power shifts under control of the driver and in response to the speed of travel of the motor vehicle.

A further object is to provide an improved transmission operating system for control of positive interengageable drive control elements such that tendency of the parts to bind or fail to operate is obviated.

Further objects and advantages of our invention will be more apparent from the following description of a typical embodiment, reference being had to the accompanying drawings, in which:

Fig. 1 is a diagrammatic plan view of the driving power plant for the vehicle.

Fig. 2 is a sectional plan view through the transmission.

Fig. 3 is a transverse sectional elevational view taken longitudinally through the transmission.

Fig. 14 is an electrical control diagram of the transmission.

Fig. 15 is a similar view of a modified control system.

Fig. 16 is an enlarged sectional view of a servo-motor piston of modified construction.

Figure 4:
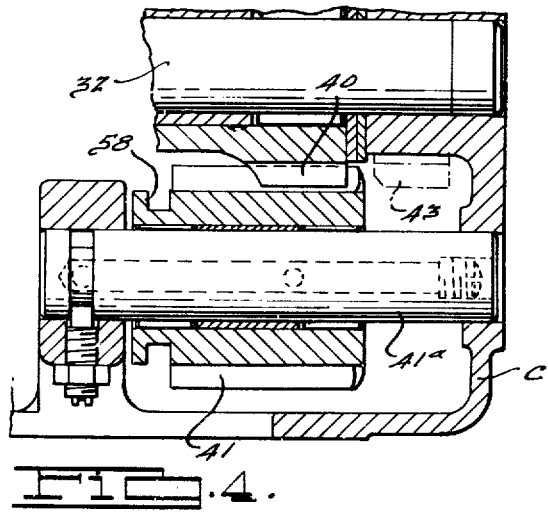
Fig. 4 is a detail sectional elevational view illustrating the reverse idler gear.
Figure 5:
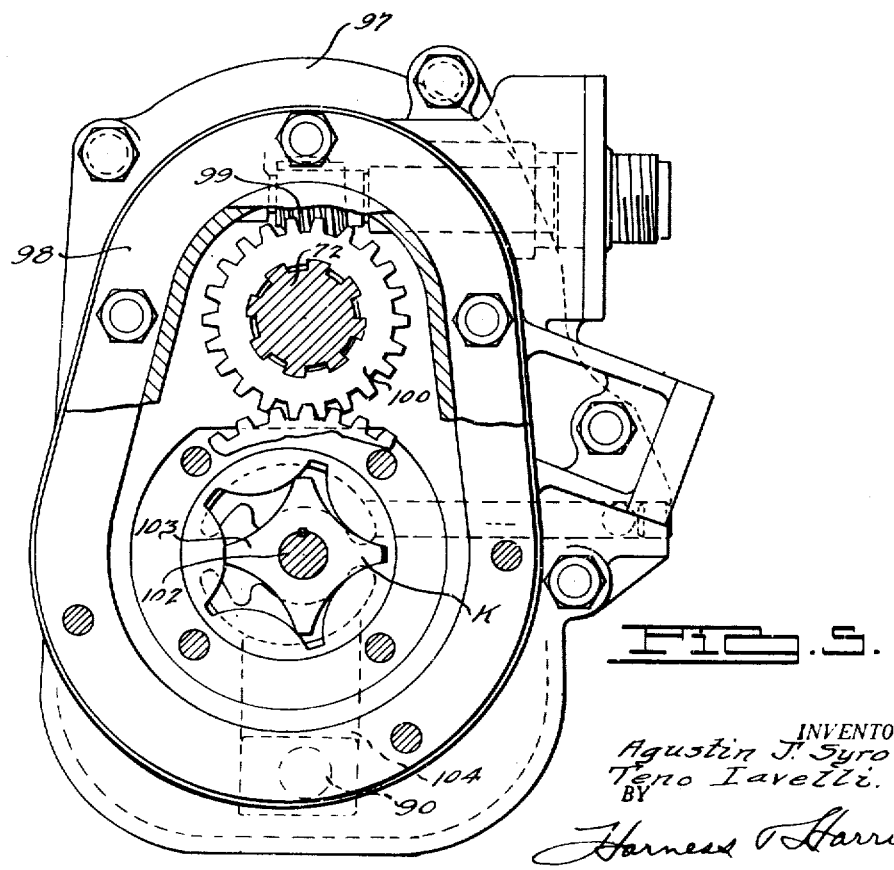
Fig. 5 is a sectional elevational view through the pump driving mechanism, the view being taken as illustrated by line 5—5 of Fig. 3.

In the drawings, Fig. 1 illustrates a typical motor vehicle power plant having a conventional engine A transmitting power through a hydraulic coupling and clutch assembly B of conventional arrangement, the drive then passing through transmission C to the rear vehicle ground wheels 20.

Figure 7:
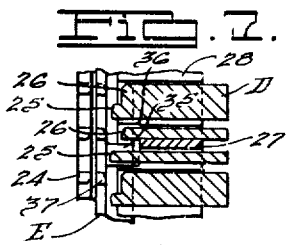
Fig. 7 is a partial development plan view of the automatic clutch sleeve and associated blocker controlled clutching parts, the sleeve being shown in fully released position and the blocker leading the sleeve.

The transmission C comprises an input or driving shaft 21 which receives drive from engine A by way of the clutch assembly B, and an output or driven shaft 22 which is adapted to transmit drive to the vehicle ground wheels 20. The driving shaft 21 carries the main driving gear or pinion 23 and a set of positive jaw-type clutch teeth carried by an automatic clutch sleeve D. The teeth of sleeve D are alternately cut back to provide in effect relatively long teeth 25 and short teeth 26, alternate adjacent pairs being bridged together as shown in Fig. 7.

Sleeve D is slidably splined at its non-bridged teeth 25, 26 on the axially fixed teeth 27 of a hub 28 carried by the driven third speed gear 29 which is rotatably journalled on the driven shaft 22 and adapted to be clutched thereto. The forward shift of sleeve D for clutching with teeth 24 is controlled by a blocker E whereby such clutching is limited to synchronous relationship in the speeds of rotation of gears 23 and 29 and, in the particular transmission illustrated, limited to engine coast conditions. When sleeve D is clutched with teeth 24, then the gears 23 and 29 are in two-way direct drive relationship for a 1 to 1 speed ratio drive therebetween.

Gear 29 is also adapted to be driven from gear 23 at a speed ratio different from 1 to 1 and to this end we have shown a countershaft type one-way reduction driving means between these gears. This drive comprises the coaxially rotatable countershaft gears 30 and 31 respectively in constant mesh with gears 23 and 29 and having an overrunning clutch F operably interposed therein. A stationarily mounted shaft 32 provides a journal support for the countershaft gears. Assuming the usual clockwise rotation of shaft 21, as viewed when looking from front to rear of Fig. 3, then overrunning clutch F will automatically clutch gears 30 and 31 together when gear 30 is driven counterclockwise at a speed tending to exceed that of gear 31 and automatically release the drive between these gears to allow gear 30 to freely slow down below the speed of gear 31.

As thus far described, it will be apparent that with the parts arranged as in Fig. 3, drive of shaft 21 will cause the output gear 29 to be driven at a reduction drive through gears 23, 30, overrunning clutch F, and gear 31. Should the sleeve D be biased forwardly during this reduction drive, blocker E will obstruct sleeve D in an intermediate position of its shift preventing ratcheting of its teeth with teeth 24. However, if the driver releases the engine throttle control in the form of the usual accelerator pedal then, as will presently be apparent, overrunning clutch F will allow gear 23 to freely coast down relative to the sustained speed of gear 29 and when the speed of gear 23 reaches that of gear 29 blocker E will move to an unblocking position and allow sleeve D to move further forwardly to clutch with teeth 24 under synchronous conditions to provide the direct drive, clutch F continuing its overrunning operation. Upon return of sleeve D to its disengaged Fig. 3 position followed by speeding up the engine, overrunning clutch F will automatically engage to restore the reduction drive.

Referring particularly to Figs. 3, and 7 to 11, blocker E is under constant bias by a spring 33 of very light compression to cause the blocker to frictionally engage the cone portion 34 of gear 23 whereby the blocker attempts to assume the speed of gear 23 within the limits allowed by a lost motion "clocking" connection with hub 28 provided by the engagement of blocker drive lug 35 in a recess 36 of hub 28. The blocker has blocking teeth 37 engageable with the teeth of sleeve D to perform the blocking function.

In Fig. 7 the sleeve D is in its initial released position of Fig. 3 and the engine is driving gear 29 through the reduction drive thus causing gear 23 to rotate faster than gear 29. Blocker E is frictionally moved to one end of recess 36, leading the sleeve D.

Figure 8:
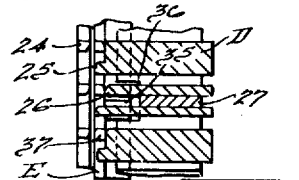
Fig. 8 is a similar view illustrating the sleeve in drive blocked position.

In Fig. 8 the sleeve is shown biased forwardly to its intermediate blocked position during the Fig. 7 condition of drive through the overrunning clutch F. In Fig. 8 the drive lug 35 is in the position of leading the gear 29 as in Fig. 7 because gear 23 is rotating faster than gear 29. Short teeth 26 now engage the blocker teeth 37 thus blocking sleeve D against further forward movement and long teeth 25 are extended between adjacent blocker teeth 37 but there is no ratcheting of the teeth of sleeve D with teeth 24.

This is the condition known as drive block of the sleeve D preparatory to clutching sleeve D with teeth 24 and may be maintained as long as desired simply by maintaining the speed of gear 23 faster than that of gear 29.

Figure 9:
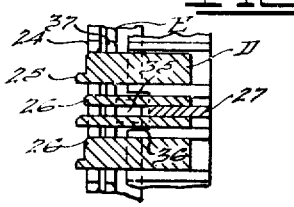
Fig. 9 is a similar view illustrating the clutch sleeve fully clutched with the driving gear.
Figure 10:
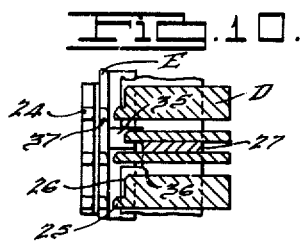
Fig. 10 is a similar view illustrating the sleeve in fully released position with the blocker lagging the sleeve.

If now the driver releases the accelerator pedal then the gear 23 will begin to drop in speed and clutch F will overrun allowing gears 29 and 31 to maintain their speeds. As the speed of gear 23 falls off to approach the speed of gear 29, blocker D will be finally moved by its friction connection at 34 at the time when gear 23 has dropped to substantially the speed of gear 29 causing the blocker teeth 37 to slide off the ends of the short teeth 26 whereupon the sustained forward bias on sleeve D causes pairs of the teeth 25, 26 to move forwardly between the spaces between adjacent blocker teeth 37 and finally to interengage with clutch teeth 24 as shown in Fig. 9. Thus clutching of sleeve D is effected under blocker control during engine coast from a condition of drive block, such clutching protecting the mechanism against clutching under engine torque and insuring smooth clutching.

Figure 11:
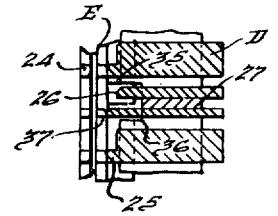
Fig. 11 is a similar view illustrating the blocker in coast blocking relationship relative to the sleeve.

Fig. 11 illustrates the condition of coast block from which clutching of sleeve D is prevented without first establishing the drive block condition. In Fig. 11 the sleeve D has been biased forwardly from the Fig. 10 position while the gear 23 is rotating at a speed less than that of gear 29. This condition may be experienced where, for example, with the accelerator pedal released for engine idling, the vehicle accelerates from rest down a hill until the vehicle speed or other controlling instrumentality effects forward bias of sleeve D. Blocker E lags gear 29, the drive lug 35 being positioned at the end of recess 36 opposite to that shown in Figs. 7 and 8. Now the long teeth 25 engage the blocker teeth 37 holding the sleeve D blocked. If now the engine is accelerated by depressing the accelerator, gear 23 speeds up and in approaching the speed of gear 29 causes blocker teeth 37 to be rotated clockwise with gear 23 so as to slide off the ends of long teeth 25. Owing to the difference in the lengths of teeth 25 and 26 and because of the rotation of gear 23 faster than gear 29, the sleeve D will not pass through the blocker teeth 37 as the ends of the short teeth 26 will engage the blocker teeth. Thus, in effect, the blocker teeth jump the gap between the long and short teeth and the parts become positioned in the Fig. 8 drive block relationship with the engine picking up the reduction drive through the overrunning clutch F. Then if the accelerator pedal is released for the coast, sleeve D will become clutched as illustrated in Fig. 9 as aforesaid.

Transmission C is arranged to provide four forward speeds, neutral, and reverse along with automatic coast step-up at sleeve D from first to second, third to fourth, and a reverse step-up. Accelerator pedal kickdown is also provided as a step-down from fourth to third, second to first, and in the reverse.

Countershaft gear 31 is a part of a cluster comprising the cam portion 38 for the rollers 39 of overrunning clutch F and a gear 40. Meshed with gear 40 is a mainshaft first speed gear 42 loose on the shaft 22, the latter carrying splined thereto the reverse driven gear 43. A reverse idler gear 41 (Fig. 4) is rotatably journalled on an idler shaft 41ª and is in constant mesh with gear 40. For the reverse drive idler 41 is shifted rearwardly to mesh with gear 43 shown out of its true position in Fig. 4.

A manually shiftable clutch G is slidably splined on a hub 44 fixed to shaft 22 and selectively clutches by shifting clutch G forwardly or rearwardly with teeth 45 or 46 under control of conventional synchronizer blockers 47 and 48 thereby to selectively clutch shaft 22 either with gear 29 or gear 42.

When clutch G is shifted forwardly to clutch with teeth 45 of gear 29, then with sleeve D released as in Fig. 3, there is provided a normal vehicle starting ratio in third speed through parts 23, 30, F, 31, 29, 45, G, 44, and 22. If now sleeve D is clutched with teeth 24 as aforesaid, then fourth speed or direct is obtained through parts 23, 24, D, 28, 29, 45, G, 44, and 22. For the kickdown from fourth to third, sleeve D is released thereby restoring third by picking up on the overrunning clutch F.

When clutch G is shifted rearwardly to clutch with teeth 46 of gear 42, then with sleeve D released as in Fig. 3, there is provided a maximum torque multiplying drive in first or low through parts 23, 30, F, 40, 42, 46, G, 44, and 22. If now sleeve D is clutched with teeth 24 as aforesaid, then second speed is obtained through parts 23, 24, D, 28, 29, 31, 40, 42, 46, G, 44, and 22. For the kickdown from second to first, sleeve D is released thereby restoring first by picking up on the overruning clutch F.

For low reverse, idler gear 41 is meshed with gear 43, thus effecting reverse drive through parts 23, 30, F, 40, 41, 43, and 22. On coast, step-up of the reverse may be obtained by clutching of sleeve D, the faster reverse drive then passing through parts 23, 24, D, 29, 31, 40, 41, 43, and 22. Likewise by release of sleeve D the original low reverse drive may be restored.

As will presently be more apparent, vehicle speed responsive control means is provided for operation of sleeve D so that first, third, and low reverse are free-wheeling in the ordinary sense only below very low car speeds because ordinarily after the car is accelerated in any of these speeds release of the accelerator pedal will effect clutching of sleeve D for a two-way drive in second, fourth, or fast reverse almost immediately and as soon as the engine speed drops to synchronize the speed of pinion 23 with that of gear 29. When the car is brought to rest from a transmission setting in second, fourth, or fast drive reverse, or when the accelerator pedal is fully depressed, the automatic step-down or kickdown is effected accompanied by momentary unloading of the torque between the teeth 24 and the teeth of sleeve D thereby providing first, third, or low reverse as the case may be. Because of the fluid coupling at B between the engine A and transmission C it is not necessary for the driver to effect disconnection, as by de-clutching, in the drive between the engine and transmission. Ordinarily such de-clutching is employed at pedal 50 (Fig. 1) only in setting the transmission for forward or reverse drive and for shifting to neutral when parking the car.

Usually, forward driving is effected by manually shifting sleeve G forwardly for high range clutching with gear 29. The car is then accelerated in third with coast step-up to fourth, thence automatically back to third under governor control in stopping or in response to accelerator kickdown when torque multiplication is desired through the transmission. Starts and stops are thus made without de-clutching at pedal 50 as the fluid coupling allows the engine to idle with the car at rest.

If desired, the car may be started in first by shifting sleeve G to clutch with gear 42, thence automatically to second for a coast step-up under governor control. On stopping or in response to accelerator kickdown, first is automatically restored. When in second, a shift of sleeve G forwardly to clutch with gear 29 will provide fourth, skipping third. Also, starting in first followed by forward shift of sleeve G will provide third, skipping second, and fourth is then obtained by the coast step-up.

When sleeve G is maintained in its Fig. 3 neutral position, low reverse is obtained by rearward shift of idler 41. Step-up of reverse may be effected by coast under governor control followed by restoration of low reverse by stopping the car or by accelerator kickdown.

In order to effect manual shifts of sleeve G any suitable selective shifting means may be employed, prefereably of the type adapted for selective shift control by the car driver at the steering column as, for example, set forth in the patent to O. E. Fishburn No. 2,284,191 of May 26, 1942. This general type of control is well known in the art and forms no part of the present invention and is accordingly disclosed only in part in the accompanying drawings. Selector operator member 51 is biased by a spring 52 for engaging the yoke 53 which is mounted on a shift rail 56, the yoke 53 operating in the groove 54 of sleeve G so that by rotating the member 51 by means of a shaft 55 the sleeve G may be shifted forwardly or rearwardly for the high or low forward drive ranges. The operator 51 is depressed by rocking lever 57 for effecting selection of member 51 with the reverse shift rail (not shown) so that by then rotating member 51 the idler 41 may be shifted rearwardly by a suitable yoke (not shown) engaged in the idler gear groove 58.

In order to control the shift of sleeve D there is provided a spring and pressure fluid operated serve-motor H comprising a cylinder 62 receiving the fluid operated element or piston 63 having the inner and outer forwardly extending skirts 64 and 65 respectively slidably fitting a rod 66 and cylinder 62. This rod has a rear enlarged portion 67 defining a shoulder 68 engageable with piston 63, the portion 67 being slidably supported in an opening in the rear wall 69 of cylinder 62 and the forward end of rod 66 being slidably supported at its head portion 70 in an opening 71 of the stationarily mounted member 72 which is fixed to the transmission case.

Piston 63 has its outer skirt 65 reduced at 73 adjacent the cammed portions 74, 75 for controlling operation of an ignition control switch J of known type. This switch (Fig. 14) is biased to open position by a spring 76 and has is operating stem engaging a ball 77 so arranged in association with the piston portion 73 that switch J is open when piston 63 is in the Fig. 13 position of forward movement to the end of its pressure fluid operated stroke which is limited by engagement of the piston skirt 65 with the annular member 78 fixed within cylinder 62. When the piston 63 is at the end of its rearward stroke, as in Figs. 2 and 12, at which time the cylinder 62 is vented, then switch J is likewise open as the forward end of the piston skirt is then spaced rearwardly from the ball 77.

Figure 6:
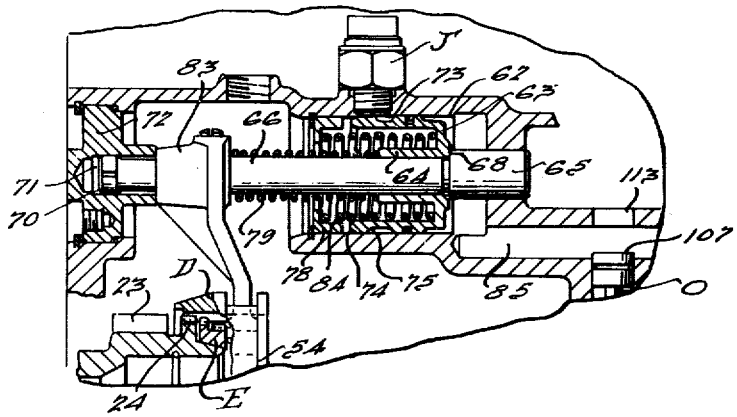
Fig. 6 is a detail view of the servo-motor as seen in Fig. 2 but illustrating the clutch sleeve in its clutched position and the servo-motor vented and in an intermediate position of its clutch releasing operation.

The forward end of the piston skirt 65 engages one end of the relatively light sleeve engaging spring 79. A shift yoke 81 engages the shift groove 54 of sleeve D and has a mounting head portion 83 secured in fixed relation to the rod 66 and against which the forward end of spring 79 bears to impart forward bias on sleeve D in response to forward thrust transmitting movement of piston 63. Forward movement of head 83 is limited as in Fig. 6 by the aforesaid member 72. A relatively strong or heavy kickdown spring 84 extends in th space between skirts 64 and 65 to seat at its rear end on the piston 63, the forward end of spring 84 being seated on the abutment member 78. Springs 79 and 84 are thus concentrically arranged and coaxial with the piston 63 and nested therein.

Figure 13:
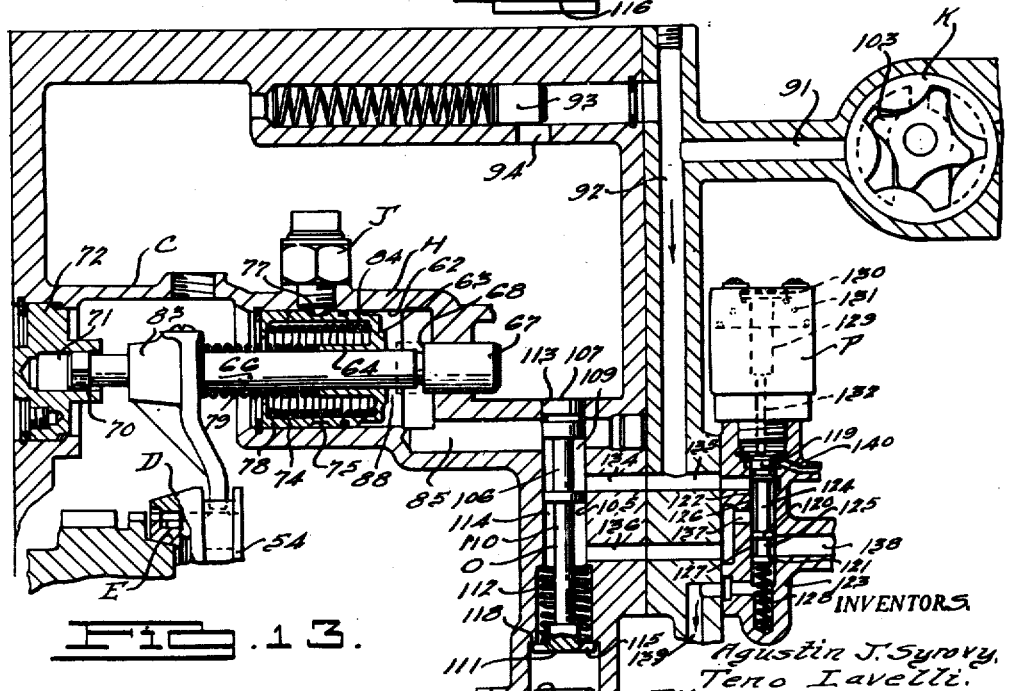
Fig. 13 is a similar view illustrating the servo-motor operated by fluid pressure and the sleeve in the Fig. 8 drive blocked position.

When oil under pressure is admitted at passage 85 to cylinder 62, piston 63 completes its forward power stroke to its Fig. 13 position serving to compress and further load the kickdown spring 84. At the same time, the engaging spring 79 is further compressed biasing the yoke 81 and hence sleeve D forwardly as well as rod 66 which moves with yoke 81 and sleeve D. However, sleeve D will be intercepted by blocker E as in Figs. 8 and 13 and will not move to clutch with teeth 24 for one of the aforesaid step-up transmission changes until the engine is allowed to coast from the Fig. 8 drive block condition as aforesaid. Although, during the pressure fluid power stroke of the piston, the cams 74 and 75 cause a momentary closing of the switch J, the engine ignition is not interrupted because at such time the ignition grounding line is elsewhere broken as will be presently apparent. When piston 63 is in its forward position of Fig. 13, switch J is open because cam 75 has moved forwardly free of the ball 77 as indicated by the broken line showing in Fig. 14.

The forward stroke of the piston 63 is limited by engagement of the skirt 65 with the member 78. The forward stroke of the collar 83 and sleeve D is less that of piston 63 and is determined by engagement of the yoke head 83 with the fixed stop 72. The difference in the strokes of the piston and sleeve is such as to open a lost-motion gap 88 (Fig. 13) between the forward end of the rod shoulder 68 and piston 63, Fig. 13 illustrating the forwardmost position of shoulder 68 by the broken lines, this gap 88 being sufficient to permit cam 75 to close switch J when the oil pressure is relieved at the cylinder 62 while sleeve D remains in its clutched position. In this manner the ignition is interrupted for the downshift movement of sleeve D while torque is being transmitted between the teeth 24 and the teeth of the sleeve, the ignition interruption serving to unload the torque sufficient to allow the spring 84 to restore the sleeve D to its Fig. 3 position. Thus when the oil pressure is vented at cylinder 62, by the kickdown movement of the accelerator pedal or by action of the governor in stopping the car, spring 84 operates to move piston 63 to take up the lost-motion gap 88, cam 75 closing the switch J to effect ignition interruption and torque unloading at sleeve D. Then, because of the piston 63 engaging the rod shoulder 68, rod 76 and yoke 81 move rearwardly as a unit by action of the heavy spring 84, cam 74 serving to restore the ignition by allowing switch J to open just as the sleeve teeth are leaving teeth 24, the rod and yoke along with the piston 63 continuing the rearward movement back to the Fig. 12 position until piston 63 abuts the cylinder head portion 69.

The medium employed to operate the motor H is preferably oil under pressure and the oil in the transmission is preferably employed. This oil is stored in the sump or reservoir 89, a pump K drawing oil by an inlet pipe 90 and chamber passage 90′ and delivering oil under pressure to the outlet 91 leading to the gallery 92 closed at one end (Fig. 12) by a spring loaded relief valve 93 arranged to quickly build up the desired pressure in the pressure system served by the pump K and to maintain this pressure, excess oil pressure being relieved by unseating valve 93 until relief or vent passage 94 is exposed to the gallery 92 to an extent determined by the speed of pump K and demand of the system for oil under pressure.

Pump K is preferably driven at a speed proportionate to the speed of travel of the car, as is also a governor L. Both of these devices may be driven from a common gear, if desired, or by separate gears as illustrated. Governor L is shown (Fig. 14) as being driven from a helical gear 95 carried by the countershaft cluster and meshed with the driven gear elements 96 for driving governor L. Inasmuch as for all vehicle drives, the countershaft cluster is drivingly connected with the driven shaft 22, it will be apparent that the governor is driven at speeds proportionate to the car speed.

Governor L is provided with a switch M so arranged that it is biased closed until the vehicle is driven up to some predetermined speed, such as around 18 to 20 miles per hour in third for example, at which speed the switch will open. The governor will also open at some lesser speed in accelerating the car from rest in first, depending on the difference in the selected gear ratios of first and third, because in first the countershaft will rotate faster than in third for a given car speed. As will be apparent presently, opening of the governor switch M effects fluid energization of motor H for upshift at sleeve D although the upshift may be delayed under driver control as it is not effected until the driver releases the accelerator pedal to bring about the engine coast. For the downshift operation of sleeve D, governor switch M will close to bring this about when the car slows down to some desired speed usually less than that at which switch M opens due to inherent friction and inertia factors often designed into the governor for desirable overlap in the speeds of functioning to operate switch M. Thus, for example, switch M may close at around 10 to 12 miles per hour of car speed when in fourth and, of course, at a lesser car speed when the car is brought to rest in second. Sleeve D is also controlled for the downshift independently of closing of governor switch M, as by the kickdown operation of the accelerator pedal as will be presently described.

The rear end of the transmission case is closed by a pump housing structure comprising a housing member 97 and a rear cover 98 therefor. Within the member 97 the shaft 22 drives the usual speedometer gear 99 and has splined thereon a pump drive gear 100 meshed with the driven gear 101 secured to an outboard portion of a pump countershaft 102 journalled in members 97 and 98 and carrying the driving pump member 103. The gears 100, 101 may be readily removed and other gears of different ratio substituted where variation in pumping pressures over the car speed range is desired.

Pump K draws its oil from the intake chamber 104 which is open to the tube 90 having its forward intake end disposed near the mid-length of the sump 89 so that when the car is travelling on a downgrade the inlet end of pipe 90 will still be below the level of the oil in the transmission case.

Oil under pressure, the pump K is delivered to gallery 92 and thence to motor H under control of a pilot valve N and a main valve O. This latter valve is slidably mounted in a bore 105 of the transmission case and has a neck portion 106 connecting the upper head portion 107 with the intermediate head portion 108. These head portions slidably fit the bore 105 and define therewith the annular chamber or passage 109.

Below the head portion 108 the main valve O has another neck 110 carrying at its lower end the abutment 111, a spring 112 operating between the case and this abutment to bias the valve to its Fig. 12 position of venting motor H by opening passage 85 to the vent port 113 from which oil from the motor spills over to the sump 89. A second annular chamber or passage 114 surrounds the neck 110.

Figure 12:
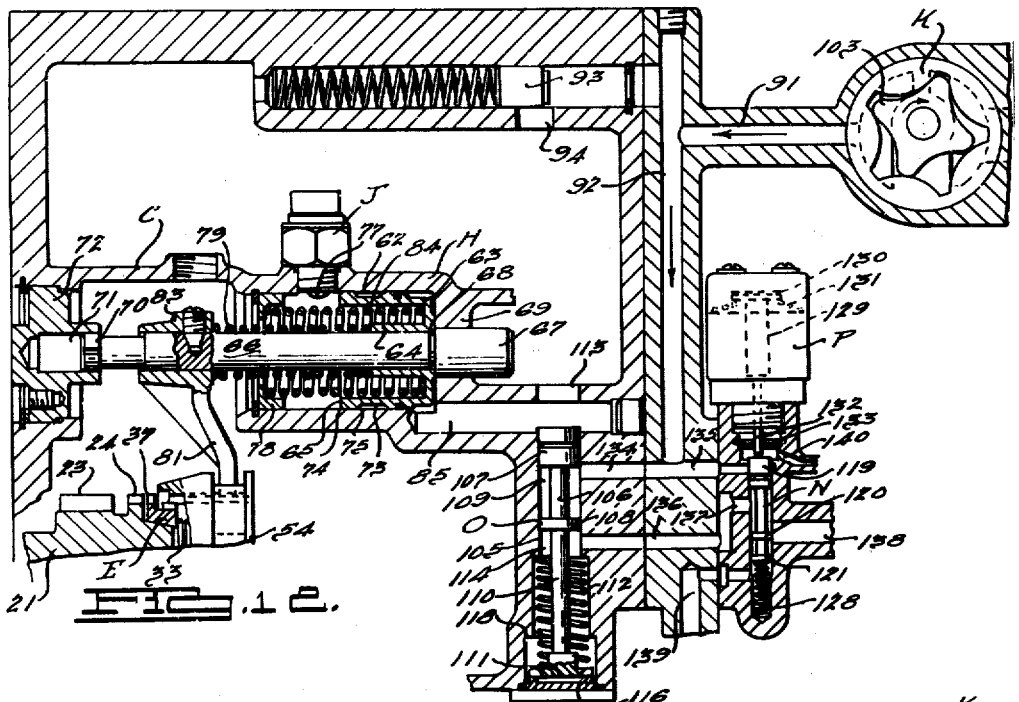
Fig. 12 is a view of the Fig. 6 servo-motor with the parts including the clutch sleeve in fully released position and illustrating diagrammatically the pumping and valving system.

The abutment 111 has a series of peripheral openings 115 formed around its margin and seats in the Fig. 12 position on a base member 116 at the annular upstanding flange 117 thereof so that oil in chamber 114 is free to flow downwardly around neck 110 then through openings 115 and beneath the face of abutment 111. In this manner the oil in chamber 14 when under pressure operates with a net upward force on valve O and causes the valve to move to its Fig. 13 position limited by the abutment 115 striking the case shoulder 118.

The pilot valve N is formed with the head portions 119, 120, and 121 slidable in a bore 122 of the valve housing 123, these head portions being connected by reduced neck portions 124 and 125 defining the annular chambers or passages 126 and 127. Valve N is biased upwardly to its Fig. 13 position by a spring 128 and is moved downwardly to its Fig. 12 position by a solenoid P mounted above valve N on the housing 123.

Solenoid P comprises an armature 129 biased upwardly by a spring 131 which acts between the usual coil of solenoid P and a head 130 carried by armature 129. This armature has a reduced stem portion 132 which freely passed through an abutment ring 133 for engagement with the head portion 119 of valve N such that when the solenoid P is energized then the armature 129 moves downwardly from the Fig. 12 position to the Fig. 13 position causing the valve N to be lowered.

In the Fig. 13 position, upward bias of valve N by spring 128 is limited by engagement of head 119 with the abutment ring 133, it being noted that the end of stem 132 is spaced above head 119 by a short distance sufficient to cause the armature, when solenoid P is energized, to gain momentum prior to engaging head 119. This results in the armature imparting a hammer-like blow on the head 119 and although this blow is of relatively small force it is sufficient to overcome any sticking tendency of the valve N as might be caused by cold weather making the oil sluggish or due to other causes.

The header 92 is in communication with branch passages 134, 135 opening respectively to chamber 109 and to chamber 126 under control of head 119. Chamber 114 communicates through a passage 136 with the port 137 which is always registered with chamber 126. A drain passage 138 leads from valve N back to the sump 89 and communicates with chamber 127 and, when valve N is moved downwardly as in Fig. 12, with the chamber 126. A further drain for returning oil from the bore 122 below head 121 is provided at 138 and from the space above head 119 by a vent 140. These vents insure against any oil accumulating below head 121 and above head 119 and render unnecessary sealing these heads against minor leakage. Furthermore, the valve N may be fitted so as to move freely and being very small in size requires only a small capacity solenoid P to move the valve against the light spring 128.

In Fig. 12 the solenoid P is energized causing valve N to move sufficiently so that head 119 blocks the branch passage 135. Under these conditions valve O is lowered by spring 112 and oil from passage 134 enters chamber 109 where it is trapped between heads 107 and 108 and has no moving effect on valve O. Therefore oil delivered by pump K escapes from the system entirely at port 94 under control of relief valve 93. At the same time oil from motor H drains through passage 85 and port 113. Oil in passage 114 also drains through passage 138 by way of passage 136, port 137, and passage 126, it being noted that head 120 now opens passage 126 to the vent passage 138.

When the solenoid P is de-energized then spring 131 raises armature 129 and spring 128 raises the pilot valve N to the Fig. 13 positions of these parts. This causes head 119 to open passage 135 to valve passage 126 and the oil from pump K thus flows under pressure from passage 126 through port 137 and passage 136 to valve chamber 114. The oil pressure in chamber 114 having an upward force on valve O causes this valve to quickly raise to its Fig. 13 position.

The parts are so proportioned that head 107 closes vent port 113 prior to the head 107 opening passage 109 to the passage 85 as otherwise the valve O would not complete its upward stroke. In this manner oil under pressure is supplied from header 92 and branch passage 134 through passages 109 and 85 to cylinder 62 of motor H causing piston 63 to move forwardly on its power stroke as aforesaid. At this time passage 114 is closed from drain 138 as the head 120 closes passage 126 from drain passage 138.

It will be apparent that with the illustrated arrangement it is possible to employ a solenoid P of very small size as the work required to be performed by the solenoid is of a very small order. Furthermore, the solenoid P is required to move its armature 129 for only a very short stroke in operating the pilot valve N from the Fig. 13 position inwardly to a position shown in Fig. 12 where the pilot valve closes the outer end of the passage 135. Furthermore valve N is balanced against the action of the oil pressure and solenoid P is not required to act against the oil pressure, this being of advantage. Furthermore, this very small size capacity solenoid P requires only a correspondingly relatively small amount of current for its energization and this in turn enables the use of a relatively simple and inexpensive arrangement of wiring and control system.

The arrangement also has the advantage of utilizing the oil pressure in the chamber 114, after the pilot valve N has been moved to its Fig. 13 position, for moving the valve O from the Fig. 12 position to the Fig. 13 position, and with such an arrangement the valve stroke may be made as long as desired and generous porting may be provided so as to insure proper working of the system within liberal tolerances in the manufacture of the parts. This in turn simplifies the control system and renders the same fool-proof in the assembly and use of the operating mechanism. It will be apparent that with the valving parts positioned as illustrated in Fig. 13, at which time the pressure fluid is being supplied to the motor H for effecting clutching of the sleeve D and for maintaining the same clutched, energization of the solenoid P will cause the pilot valve N to be restored to the Fig. 12 position. This immediately opens the passage 114 to the vent 138 whereupon the spring 112 operates to move the main valve O from the Fig. 13 position back to the Fig. 12 position. At this time the head 107 of the main valve O blocks the upper end of bore 105 serving to cut off the supply of pressure fluid from the gallery 92 to the passage 85 and opening this passage to the vent or relief port 113 whereupon the motor H is vented and the kickdown spring 84 comes into action for effecting disengagement of sleeve D back to the Fig. 12 position, preferably accompanied by some form of torque unloading at the teeth of sleeve D hereinafter illustrated as a means for momentarily interrupting the ignition system of the engine A. When valve O moves downwardly from its Fig. 13 position the head 107 covers the upper end of bore 105 prior to opening the vent port 113 to the passage 85.

Referring now to Fig. 14, we have diagrammatically illustrated an electrical system for control of the transmission mechanism wherein the solenoid P is grounded at one end at 141 and has its other end extending by a conductor to a wire 142 under control however, of a set of switch points 143 of a relay Q. A spring 144 biases the relay points so that they will open and the relay further includes the energizing solenoid 145 for controlling the relay points in conjunction with spring 144. In Fig. 14 it will be apparent that the solenoid 145 is energized thereby serving to close the points 143 against the biasing action of the spring 144.

The wire 142 extends through a fuse 146 to the wire 147 and thence through the ignition switch 148, ammeter 149, to the usual storage battery 150 having a ground at 151. The wire 142 from the battery extends to one end of the solenoid 145 and also by shunt connection through the points 143, solenoid P, and thence to the ground 141, as aforesaid. The other end of the solenoid 145 is adapted to be grounded at either of two shunt paths leading to the grounds 152 and 153. One of these paths extends by wire 154 through an accelerator pedal controlled kickdown switch 155 illustrated as a snap type of switch controlled by the snap-over operator 156. The other shunt path extends by a wire 157 through the aforesaid governor controlled switch M operated by the governor L which is driven as aforesaid at a speed proportionate to the travel of the motor vehicle by reason of the drive 95, 96 shown in Fig. 14.

The usual accelerator pedal 158 is diagrammatically illustrated as operating through the linkage 159, 160 connected to the conventional engine throttle valve 161, the linkage also including a lever 162 pivotally supported at 163 and being provided with the spaced fingers 164 and 165 operably associated with the switch operator 156. In Fig. 14 the accelerator pedal is illustrated in its fully released position under the biasing action of spring 166 causing the throttle valve 161 to close and bringing the finger 165 in position to move the switch operator 156 to a position for opening the kickdown switch 155, thereby breaking the shunt path through wire 154 to the ground 152. The arrangement is such that when the operator depresses the accelerator pedal 158 the throttle valve 161 is proportionately opened and as the accelerator pedal nears its wide open throttle position then the finger 164 will be brought to register with the switch operator 156 so that during the final throttle opening movement of the accelerator pedal, usually the last seven degrees of throttle opening movement, the switch 155 will be operated so as to snap over to its closed position thereby grounding the wire 154 at 152. Furthermore, once the kickdown switch has been closed in this manner, then it will remain in the closed position until the accelerator pedal has been fully released, it being apparent that during the last few degrees of final releasing movement of the accelerator pedal the finger 165 will be operated so as to effect the snap-over action of switch 155 to restore the same to the open position illustrated in Fig. 14.

Extending from the battery supplied current delivery wire 147 is a wire 167 leading to a conventional system of ignition R for the engine A, this comprising the usual primary coil 168 and secondary coil 169, the latter leading to the usual distributor 170 and the various grounded spark plugs, one of which is illustrated at 171. The primary coil 168 extends by a wire 172 to the usual breaker mechanism 173, means being provided to momentarily ground the ignition system through a grounding wire 174 connected to the primary coil and leading through the ignition controlling switch J for grounding either at 153 through the governor switch M or at 152 through the kickdown switch 155.

The system as illustrated in Fig. 14 illustrates the condition of the parts when the car is at a standstill with the engine operating under idling condition at which time the accelerator pedal 158 is released, the kickdown switch 155 is open, the governor switch M is closed, and the motor H is vented so that the sleeve D is in its rearward released position illustrated in Fig. 12 at which time the interrupter switch J is open. With the governor switch M closed, current from the battery 150 flows through the wire 142, solenoid 145, governor switch M to the ground 153. With the relay solenoid 145 energized relay points 143 are closed. Therefore, solenoid P is energized such that the pilot valve N will be in its Fig. 12 position opening the passage 114 to the vent 138. Although the governor switch M is closed, it will be apparent that the ignition system R is not grounded at 153 because the interrupter switch J is open.

In driving the car forwardly the driver will depress the clutch pedal 50 and manually manipulate the transmission C for either first or third speeds or else reverse. Ordinarily vehicle starts are made by shifting sleeve C forwardly to the high range for clutching with the teeth 45 and with the sleeve shifted in this manner and the clutch pedal 50 released, the car may be accelerated by depressing the accelerator pedal 158.

As the car is accelerated in third the critical speed of the governor L will be reached causing the governor switch M to open and effecting energization of the motor H so as to bias the clutch sleeve D forwardly. However, the clutch sleeve will have its forward motion arrested by the blocker E in the drive block position of Figs. 8 and 13 and the car may be accelerated in the third speed to any desired speed and this speed may be maintained by the driver as long as desired, the upshift from third to fourth speed being delayed until the driver releases the accelerator pedal 158 for the synchronous coast step-up of the sleeve D.

During the drive in third and when the governor L operates to open the governor switch M it will be apparent that this will de-energize the relay solenoid 145 whereupon relay spring 144 will operate to open the relay points 143. Upon opening of the points 143 solenoid P will be de-energized thereby effecting operation of the pilot valve N to the Fig. 13 position causing the oil delivered under pressure from pump K to move the main valve O from the Fig. 12 position to the Fig. 13 position and thus effect delivery of the oil pressure to the motor H for moving the piston 63 forwardly until it engages the stop 78. The sleeve D although biased forwardly by the engaging spring 79 will be brought to rest in the Figs. 8 and 13 drive block position where it will be held from ratcheting with the clutch teeth 24 until the driver releases the pedal 158 for the coast step-up engagement of the sleeve D to effect drive in fourth. Although during the forward movement of piston 63 the cam 74 will operate to momentarily close the interrupter switch J, the ignition system R will not be grounded at 153 because during this forward stroke of the piston the governor switch M is open and thus the ignition grounding line is broken.

The downshift from fourth to third may be effected by either of several controls. One of these controls responds to a full depression of the accelerator pedal 158 in bringing the throttle valve 161 to its fully opened position, thus effecting a closing operation of the kickdown switch 155. It is customary in devices of this sort to provide a yielding stop just prior to the last few degrees of throttle opening movement so that the driver does not accidentally effect the kickdown operation that is required to overcome the force of the yielding stop, which is additional to the return spring 166, although the provision of the yielding stop is not necessary. When the kickdown switch 155 is closed it will be apparent that relay solenoid 145 will be energized thus closing the points 143 and thus effecting energization of solenoid P, whereupon the pilot valve N will again be moved to the Fig. 12 position of venting the passageway 114 and causing the valve spring 112 to restore the main valve O to the Fig. 12 position of venting the motor H.

It will be apparent that when this kickdown operation is effected the throttle 158 is substantially fully open so that the engine is delivering its torque through the teeth 24 and sleeve D, thus requiring some form of torque relief in order to facilitate rearward disengaging movement of sleeve D under the biasing action of the kickdown spring 84 and in the present illustration momentary interruption of the ignition system is employed for this purpose. In Fig. 14 the cams 74 and 75 are illustrated by broken lines to show the position of these cams when the piston 63 is in its fully forward position and at this time the sleeve D is engaged, there being the lost-motion gap 88 between the shoulder 68 of the rod 67 and the rear wall of piston 63 as illustrated in Fig. 13.

When the motor H is vented the sleeve D and head 83 will remain in their fully forward positions with head 83 engaging the member 72 because of the torque at the clutch teeth 24, but the kickdown spring 84 will immediately operate the piston 63 rearwardly sufficiently to take up the gap 80, this motion being sufficient to cause the cam 75 to close the interrupter switch J thus grounding the ignition system R at 152 through the previously closed kickdown switch 155. With the ignition thus interrupted the torque is relieved at teeth 24 and the kickdown spring 84 then acts to move the piston 63, rod 67, and sleeve D rearwardly as a unit back to the Fig. 12 position of these parts, the cam 74 operating meanwhile to allow the interrupter switch J to open as the sleeve D leaves the teeth 24 thus quickly restoring the ignition system R to its normal operation. The accelerator pedal being depressed will cause the drive shaft 21 to speed up and effect operation of the third speed by automatic clutching of the overrunning clutch F and the car may then be driven in third speed until the upshift is again desired and is obtained at any time, assuming that the speed of the car does not slow down sufficiently to cause the governor swich M to close, by releasing the accelerator pedal 158 to open the kickdown switch 155 and effect de-energizing of solenoid P with resulting supply of pressure fluid to the motor H for the coast step-up engagement of sleeve D with the teeth 24.

The other of the aforementioned controls for effecting the downshift from fourth to third comprises the governor control system for automatically directing a downshift when the car reaches a predetermined relatively low speed, as for example in bringing the car to rest. This control system operates to close the governor switch M resulting in providing a ground for the relay solenoid 145 so as to effect the downshift in the same manner as aforesaid by closing operation of the kickdown switch 155, it being apparent that this downshift will be effected accompanied by momentary interruption of the ignition system just as in the case of the accelerator kickdown. Thus on bringing the car to rest, as when stopping for a traffic light, it is not necessary for the driver to manually manipulate any of the transmission controls or the clutch pedal 50, the fluid coupling at B accommodating idling of the engine with the car at rest. When it is desired to again accelerate the vehicle, then the aforesaid cycle of operations for the upshift from third to fourth is repeated.

It will be apparent that the mechanism operates for step-up and step-down between first and second speeds in the same manner as aforesaid in connection with shifts between third and fourth. It is, of course, necessary for the driver to manipulate the transmission into the low range by effecting rearward shift of sleeve G to clutch with the teeth 46 in order to initially accelerate the car in first, the step-up to second being obtained when the car is driven above the critical speed of governor L and the accelerator pedal 158 is subsequently released for the synchronous coast step-up from first to second. When driving in second the first speed may be restored by either a full depression of the accelerator pedal 158 for the kickdown operation or by bringing the car to rest or slowing the same down sufficiently to effect closing of the governor switch M just as aforesaid.

It is possible for the car to be initially accelerated in first followed by a coast step-up to second and then when the sleeve G is shifted forwardly fourth will be obtained, skipping third. On the other hand if the car is accelerated in first and the sleeve G is shifted forwardly prior to the coast step-up, then third will be obtained by skipping second, and when the accelerator pedal is released for the coast step-up above the critical governor speed the fourth or direct speed will be brought into action.

The same general system responds in coast step-up and kickdown and driving in reverse which is effected by a rearward shift of the idler 41 into mesh with the gear 43. When the car is driven in this low reverse starting speed, accelerator pedal 158 may be fully released for a coast synchronous step-up by forward shift of sleeve D and the low reverse may be restored by bringing the car to rest or by kickdown operation of the accelerator pedal, the general system operating just as aforesaid.

It will furthermore be apparent that the system will operate to drive the engine A in order to start the same as when the battery 150 is deficient. Under such conditions the driver may shift the sleeve G to either the low or high range and when the car is pushed the pump K will develop sufficient pressure so that when the governor switch M opens the motor H will be energized to effect engagement of the sleeve D and this operation may be somewhat facilitated by momentary operation of the clutch pedal 50 in instances where the blocker E may tend to block the sleeve against engagement.

In the event that the governor L operates to direct an upshift of the transmission C at a time when the driving shaft 21 is rotating at a speed less than that of the sleeve D, motor H will be energized to bias the sleeve D forwardly through the engaging spring 79 as aforesaid, but under such conditions the sleeve D will be blocked by the blocker E in the Fig. 11 coast blocking position of the parts. This condition is experienced when, for example with the transmission set for one of the forward driving speeds of first or third, the car is accelerated by action of gravity down a hill with the engine continuing to idle as accommodated by the overrunning clutch F. As the car increases in speed the governor L will open the governor switch M and effect pressure fluid operation of the motor H and the sleeve D will be brought into the coast block condition of Fig. 11. If now the accelerator pedal 158 is depressed the engine driving shaft 21 will be speeded up to a speed equal to that of the sleeve D and higher than this speed sufficiently to pick up the drive in first or third by engagement of the overrunning clutch F. Under such conditions the sleeve D will not be unblocked even though the speed of shaft 21 passes through the synchronous sleeve relationship with respect to the sleeve D, and the sleeve D will then be established in the drive block position of Fig. 8, as previously set forth in connection with the description of the sleeve and blocker relationships illustrated in Figs. 7 and 11. Clutching engagement of the sleeve D is then effected in response to a release of the accelerator pedal at the time when the engine slows down the driving shaft 21 to a condition of synchronous relationship with respect to rotation of sleeve D, thereby effecting the coast step-up from first or third to either second or fourth depending on whether the manually adjustable sleeve G is positioned in its rearward low range setting or forwardly in its high range setting.

Referring to Fig. 15, we have illustrated a modified arrangement of controlling the ignition interruption wherein the ignition grounding line now includes a second set of relay points 175 tied to the aforesaid points 143 and opening and closing therewith as aforesaid. The grounding line 174 furthermore differs from the Fig. 14 arrangement in that it is grounded at 176 beyond the ignition control switch J. With this arrangement the aforesaid gap 88 is no longer necessary but may still be employed if desired and the reduced portion 73 may now be filled in as illustrated by the skirt 65' of the piston 63' in Fig. 15 which piston is otherwise similar to piston 63. Otherwise the Fig. 15 arrangement is identical with that aforesaid, only a portion of the aforesaid embodiment including the control diagram of Fig. 14 being illustrated in Fig. 15 to avoid unnecessary duplication.

With the Fig. 15 arrangement the system operates identically as that aforesaid with the following exceptions. When the motor H is energized by pressure fluid supply thereto, piston 63' is projected forwardly so that switch J closes and then maintains switch J closed during the balance of the forward stroke of the piston. The ignition system is not grounded out however because at such time the governor switch M is open, thus de-energizing solenoid coil 145 and allowing relay spring 144 to simultaneously open both sets of points 143 and 175. Thus with points 175 open the grounding line 174 is broken.

When a downshift is called for, at the time when sleeve D is clutched, either by closing the kickdown switch 155 or by the closing of governor switch M, then relay solenoil 145 is energized causing points 143 and 175 to close. The effect of closing points 143 is just as aforesaid in that this energizes the solenoid P to vent the motor H. At the same time closing of points 175 now of itself completes the grounding circuit of line 174 to ground 176 because switch J is already closed at this time. Thus ignition interruption is not dependent on initial movement of some part to close the switch J, as is necessary in Fig. 13 in connection with gap 88, and the sleeve D is disengaged by movement of piston 63' rearwardly by the spring 84 operating to shift rod 67 rearwardly. The ignition is restored as soon as the cam 74 moves rearwardly of the ball operator 77 and this cam may be located at any desired point for timing the ignition restoring with the sleeve disengaging travel. The Fig. 15 system otherwise operates as set forth for Fig. 14.

In Fig. 16, we have illustrated a slightly modified piston construction for use instead of piston 63 of Fig. 14 and instead of piston 63' of Fig. 15 by filling in the recess 73. In Fig. 16 the piston 63ª has an annular groove 177 opening outwardly of the outer skirt 65 and receiving the annular rubber-like yielding sealing ring 178 having an outer cylindrical face in sliding sealing engagement with the cylinder 63. The groove 177 is open by a passage 179 to the pressure fluid space behind the piston and communicating with pressure fluid supply passage 85. Ring 178 is substantially U-shaped in section whereby the pressure fluid operates to seat the legs 180 of the ring 178 on the walls of the groove 178, the pressure fluid also operating to expand the ring outwardly into sealing contact with the cylinder. In this manner an efficient seal is provided to insure against fluid leakage forwardly around the piston especially where the selected size of pump K and the drive ratio therefor is such that it is desired to minimize fluid leakage. Usually the pump capacity is such that fluid leakage is not critical thus making it unnecessary to provide a seal of the pressure fluid expanded type.

We claim:

1. In a power transmission for a motor vehicle having an engine, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump at a speed proportional to the speed of the vehicle, means for controlling said delivery of pressure fluid to said pressure chamber and venting said chamber comprising, a pilot valve of relatively small inertia movable over a relatively small stroke between two positions, ported guide means for slidably guiding said pilot valve during movement thereof, said ported guide means and said pilot valve together presenting passage means for the pressure fluid so constructed and arranged as to balance said pilot valve against tendency toward displacement thereof by the pressure fluid in all positions of movement of said pilot valve, a main valve of relatively large inertia movable over a relatively large stroke between two positions and having a portion so arranged as to be acted on by the pressure fluid to produce a force acting to move said main valve to one of its said positions, a spring biasing said pilot valve to one of its said positions, solenoid operating means for moving said pilot valve to the other of its said positions, a spring biasing said main valve to the other of its said positions, means responsive to movement of said pilot valve by its said spring biasing means when said solenoid is de-energized for subjecting pressure fluid delivered by the pump to said portion of said main valve thereby to effect pressure fluid movement of said main valve to its said one position in opposition to said spring bias thereon, means responsive to said pressure fluid induced movement of said main valve for effecting communication between the pressure fluid delivered by the pump and said pressure chamber whereby to effect said pressure fluid operation of said pressure responsive member, means for controlling energization of said solenoid in response to the speed of the vehicle, means responsive to energization of said solenoid to effect return movement of said pilot valve to its said other position for venting said main valve so as to relieve the same from the movement inducing action of the pressure fluid thereby to effect return movement of said main valve by the action of said spring bias thereon, and means responsive to said return movement of said main valve for venting said pressure chamber.

2. In a power transmission for a motor vehicle having an engine, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump at a speed proportional to the speed of the vehicle, means for controlling said delivery of pressure fluid to said pressure chamber and venting said chamber comprising, a pilot valve movable between two positions, ported guide means for slidably guiding said pilot valve during movement thereof, said ported guide means and said pilot valve together presenting passage means for the pressure fluid so constructed and arranged as to balance said pilot valve against tendency toward displacement thereof by the pressure fluid in all positions of movement of said pilot valve, a main valve movable between two positions and having a portion so arranged as to be acted on by the pressure fluid to produce a force acting to move said main valve to one of its said positions, a spring biasing said pilot valve to one of its said positions, solenoid operating means for moving said pilot valve to the other of its said positions, a spring biasing said main valve to the other of its said positions, means responsive to movement of said pilot valve to its said other position for subjecting pressure fluid delivered by the pump to said portion of said main valve thereby to effect pressure fluid movement of said main valve to its said one position in opposition to said spring bias thereon, means responsive to said pressure fluid induced movement of said main valve for effecting communication between the pressure fluid delivered by the pump and said pressure chamber whereby to effect said pressure fluid operation of said pressure responsive member, means for so controlling energization of said solenoid as a function of speed of the vehicle as to effect energization of said solenoid when the vehicle is brought to rest and de-energization of said solenoid when the vehicle, on accelerating the same from rest by operation of said relatively slow speed driving means, reaches a predetermined speed, means responsive to return movement of said pilot valve for venting said main valve so as to relieve the same from the movement inducing action of the pressure fluid thereby to effect return movement of said main valve by the action of said spring bias thereon, and means responsive to said return movement of said main valve for venting said pressure chamber.

3. In a power transmission for a motor vehicle having an engine equipped with an ignition system, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump at a speed proportional to the speed of the vehicle, means for controlling said delivery of pressure fluid to said pressure chamber and venting said chamber comprising, a pilot valve of relatively small inertia movable over a relatively small stroke between two positions, ported guide means for slidably guiding said pilot valve during movement thereof, said ported guide means and said pilot valve together presenting passage means for the pressure fluid so constructed and arranged as to balance said pilot valve against tendency toward displacement thereof by the pressure fluid in all positions of movement of said pilot valve, a main valve of a relatively large inertia movable over a relatively large stroke between two positions and having a portion so arranged as to be acted on by the pressure fluid to produce a force acting to move said main valve to one of its said positions, a spring biasing said pilot valve to one of the said positions, solenoid means having an armature provided with a pilot valve operating portion so spaced from said pilot valve, when the latter is in its said one position, that movement of said armature portion will strike the pilot valve as an incident to moving said pilot valve to the other of its said positions, a spring biasing said main valve to the other of its said positions, means responsive to movement of said pilot valve by its said spring biasing means when said solenoid is de-energized for subjecting pressure fluid delivered by the pump to said portion of said main valve thereby to effect pressure fluid movement of said main valve to its said one position in opposition to said spring bias thereon, means resposive to said pressure fluid induced movement of said main valve for effecting communication between the pressure fluid delivered by the pump and said pressure chamber whereby to effect said pressure fluid operation of said pressure responsive members means responsive to energization of said solenoid to effect return movement of said pilot valve to its said other position for venting said main valve so as to relieve the same from the movement inducing action of the pressure fluid thereby to effect return movement of said main valve by the action of said spring bias thereon, means responsive to said return movement of said main valve for venting said pressure chamber, means operable to effect momentary interruption of the engine ignition system thereby to facilitate movement of said movable drive control element into its said disengaged relationship as aforesaid, said interruption means including an ignition controlling switch and means for effecting operation thereof in response to movement of said pressure responsive member.

4. In a power transmission for a motor vehicle having an engine, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump, means for controlling said delivery of pressure fluid to said pressure chamber and venting said chamber comprising, a pilot valve of relatively small inertia movable over a relatively small stroke between two positions, a main valve of relatively large inertia movable over a relatively large stroke between two positions and having a portion so arranged as to be acted on by the pressure fluid to produce a force acting to move said main valve to one of its said positions, a spring biasing said pilot valve to one of its said positions, solenoid operating means for moving said pilot valve to the other of its said positions, a spring biasing said main valve to the other of its said positions, means for supporting and guiding said valves for movement as aforesaid in side by side relationship adjacent each other, means providing a valve-controlling pressure fluid conducting passage adapted, under control of said pilot valve, to deliver pressure fluid from said pump and said pilot valve to said main valve portion, means providing a vent for said valve-controlling passage so arranged as to be selectively opened and closed under control of said pilot valve when moved between its aforesaid positions and, when so closed in response to movement of said pilot valve from one of its said positions to the other, to subject said main valve portion to pressure fluid delivered thereto through said valve-controlling passage thereby to effect said pressure fluid movement to said main valve in opposition to said spring bias thereon, means responsive to said pressure fluid induced movement of said main valve for effecting communication between the pressure fluid delivered by the pump and said pressure chamber whereby to effect said pressure fluid operation of said pressure responsive member, means for controlling energization of said solenoid in response to the speed of the vehicle, means responsive to return movement of said pilot valve for opening the vent of said valve-controlling passage thereby to relieve said main valve portion from the movement inducing action of the pressure fluid thereby to effect return movement of said main valve by the action of said spring bias thereon, and means responsive to said return movement of said main valve for venting said pressure chamber.

5. In a power transmission for a motor vehicle having an engine equipped with an accelerator controlled throttle, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump, means for controlling said delivery of pressure fluid to said pressure chamber and venting said chamber comprising, a pilot valve of relatively small inertia movable over a relatively small stroke between two positions, ported guide means for slidably guiding said pilot valve during movement thereof, said ported guide means and said pilot valve together presenting passage means for the pressure fluid so constructed and arranged as to balance said pilot valve against tendency toward displacement thereof by the pressure fluid in all positions of movement of said pilot valve, a main valve of relatively large inertia movable over a relatively large stroke between two positions and having a portion so arranged as to be acted on by the pressure fluid to produce a force acting to move said main valve to one of its said positions, a spring biasing said pilot valve to one of its said positions, solenoid operating means for moving said pilot valve to the other of its said positions, a spring biasing said main valve to the other of its said positions, means responsive to movement of said pilot valve by its said spring biasing means when said solenoid is de-energized for subjecting pressure fluid delivered by the pump to said portion of said main valve thereby to effect pressure fluid movement of said main valve to its said one position in opposition to said spring bias thereon, means responsive to said pressure fluid induced movement of said main valve for effecting communication between the pressure fluid delivered by the pump and said pressure chamber whereby to effect said pressure fluid operation of said pressure responsive member, means for controlling energization of said solenoid in response to driver operation of said accelerator in throttle opening direction, means responsive to energization of said solenoid to effect return movement of said pilot valve to its said other position for venting said main valve so as to relieve the same from the movement inducing action of the pressure fluid thereby to effect return movement of said main valve by the action of said spring bias thereon, and means responsive to said return movement of said main valve for venting said pressure chamber.

6. In a power transmission for an automotive vehicle having an engine of the type provided with an ignition system and an accelerator controlled throttle, a driving shaft adapted to receive drive from the engine, a driven shaft adapted to drive the vehicle, relatively slow speed driving means for driving the driven shaft from the driving shaft at a predetermined speed ratio, relatively fast speed driving means for driving the driven shaft from the driving shaft at a predetermined speed ratio different from that aforesaid and at a speed greater than that of said slow speed driving means and including positively interengaging drive control elements one of which is movable relative to the other, said drive control elements being adapted, when interengaged, to establish said fast speed drive, said relatively slow speed driving means including control means operating automatically to effect operation of this drive in response to release of said relatively fast speed driving means and acceleration of the driving shaft, a fluid pressure motor comprising a pressure chamber and a pressure responsive member operable therein in response to delivery of fluid under pressure to said pressure chamber, means operably connecting said pressure responsive member with said movable drive control element for biasing this control element into said interengaging relationship with the other of said drive control elements in response to fluid pressure operation of said pressure responsive member, biasing means operable, when said pressure chamber is vented, to bias said movable control element into disengaged relationship with respect to the other of said drive control elements, a pump for delivering fluid under pressure from a source of fluid supply to said pressure chamber, means for driving said pump, means for controlling said delivery of pressure fluid to said pressure chamber and venting said chamber comprising, a pilot valve of relatively small inertia movable over a relatively short stroke between two positions, a main valve of relatively large inertia movable over a relatively long stroke between two positions and having a portion so arranged as to be acted on by the pressure fluid to produce a force acting to move said main valve to one of its said positions, a spring biasing said pilot valve to one of its said positions, solenoid means having an armature provided with a pilot valve operating portion so spaced from said pilot valve, when the latter is in its said one position, that movement of said armature portion will strike the pilot valve as an incident to moving said pilot valve to the other of its said positions, a spring biasing said main valve to the other of its said positions, means for supporting and guiding said valves for movement as aforesaid in side-by-side relationship adjacent each other, means responsive to movement of said pilot valve by its said spring biasing means when said solenoid is de-energized for subjecting pressure fluid delivered by the pump to said portions of said main valve thereby to effect pressure fluid movement of said main valve to its said one position in opposition to said spring bias thereon, means responsive to said pressure fluid induced movement of said main valve for effecting communication between the pressure fluid delivered by the pump and said pressure chamber whereby to effect said pressure fluid operation of said pressure responsive member, means for controlling energization of said solenoid in response to driver operation of said accelerator in throttle opening direction, means responsive to energization of said solenoid to effect return movement of said pilot valve to its said other position for venting said main valve so as to relieve the same from the movement inducing action of the pressure fluid thereby to effect return movement of said main valve by the action of said spring bias thereon, and means responsive to said return movement of said main valve for venting said pressure chamber, means operable to effect momentary interruption of the engine ignition system thereby to facilitate movement of said movable drive control element into its said disengaged relationship as aforesaid, said interruption means including an ignition controlling switch and means for effecting operation thereof in response to movement of said pressure responsive member.

7. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a relatively long stroke large mass main valve and a relatively short stroke small mass pilot valve, a spring opposed solenoid adapted, when energized, to effect an operation of said pilot valve, ported guide means for slidably guiding said pilot valve during movement thereof, said ported guide means and said pilot valve together presenting passage means for the pressure fluid so constructed and arranged as to balance said pilot valve against tendency toward displacement thereof by the pressure fluid in all positions of movement of said pilot valve, and means responsive to spring operation of said pilot valve, when said solenoid is de-energized, for causing pressure fluid delivered by said pump to act on said main valve to effect pressure fluid operation of said main valve.

8. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor. as to selectively effect fluid operation of and venting of said motor, said valving means comprising a pilot valve adapted for reciprocation between limits defining a relatively short stroke movement and a main valve adapted for reciprocation between limits defining a relatively long stroke movement, a spring opposed solenoid adapted, when energized, to effect an operation of said pilot valve, ported guide means for slidably guiding said pilot valve during movement thereof, said ported guide means and said pilot valve together presenting passage means for the pressure fluid so constructed and arranged as to balance said pilot valve against tendency toward displacement thereof by the pressure fluid in all positions of movement of said pilot valve, and means responsive to spring operation of said pilot valve, when said solenoid is de-energized, for causing pressure fluid delivered by said pump to act on said main valve to effect pressure fluid operation of said main valve.

9. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a pilot valve of relatively small mass adapted for reciprocation between limits defining a relatively short stroke movement and a main valve of relatively large mass adapted for reciprocation between limits defining a relatively long stroke movement, ported guide means for slidably guiding said pilot valve during movement thereof, said ported guide means and said pilot valve together presenting passage means for the pressure fluid so constructed and arranged as to balance said pilot valve against tendency toward displacement thereof by the pressure fluid in all positions of movement of said pilot valve, means for reciprocating said pilot valve as aforesaid including spring opposed solenoid operating means for actuating said pilot valve in at least one direction of, and between its said limits of, its reciprocatory movement aforesaid, means responsive to spring operation of said pilot valve from one of its limits of movement to the other, when said solenoid is de-energized for causing pressure fluid delivered by said pump to act on said main valve to effect pressure fluid operation of said main valve in at least one direction of, and between its said limits of, its reciprocatory movement aforesaid thereby to effect said step-up, torque unloading means for said change speed means operable to facilitate said step-down, and means operable in response to operation of said motor when vented and in part responsive to predetermined retardation of the speed of travel of said vehicle for effecting energization of said solenoid and a momentary operation of said torque unloading means.

10. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a relatively large mass long stroke main valve and a relatively small mass short stroke pilot valve, ported guide means for slidably guiding said pilot valve during operation thereof, said ported guide means and said pilot valve together presenting passage means for the pressure fluid so constructed and arranged as to balance said pilot valve against tendency toward displacement thereof by the pressure fluid in all positions of operation of said pilot valve, solenoid operating means for effecting an operation of said pilot valve, spring means for effecting a return operation of said pilot valve, and means responsive to spring operation of said pilot valve, when said solenoid is de-energized for effecting pressure fluid operation of said main valve.

11. In a power transmission for a motor vehicle having an engine, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a main valve and a pilot valve, solenoid means having an armature provided with a pilot valve operating portion so spaced from said pilot valve, when the latter is in one position of its operation, that movement of said armature portion will impart to the pilot valve a hammerlike blow as an incident to moving said pilot valve to another position of its operation, and means responsive to operation of said pilot valve between its said positions for effecting pressure fluid induced movement of said main valve.

12. In a power transmission for a motor vehicle having an engine equipped with an accelerator controlled throttle and an ignition system, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a relatively large inertia long stroke main valve and a relatively small inertia short stroke pilot valve, ported guide means for slidably guiding said pilot valve during movement thereof, said ported guide means and said pilot valve together presenting passage means for the pressure fluid so constructed and arranged as to balance said pilot valve against tendency toward displacement thereof by the pressure fluid in all positions of movement of said pilot valve, means for effecting operation of said pilot valve comprising spring opposed solenoid means having an armature provided with a pilot valve operating portion so spaced from said pilot valve, when the latter is in its said one position, that movement of said armature portion will strike the pilot valve as an incident to moving said pilot valve, means responsive to spring operation of said pilot valve, when said solenoid is de-energized for causing pressure fluid delivered by said pump to act on said main valve to effect pressure fluid operation of said main valve, means including an ignition controlling switch operably responsive to operation of said motor for effecting momentary interruption of the operation of said ignition system thereby to facilitate step-down change in said change speed means, and means responsive to driver operation of said accelerator in throttle opening direction for effecting energization of said solenoid.

13. In a power transmission for a motor vehicle having an engine equipped with an accelerator controlled throttle and an ignition system, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, said valving means comprising a relatively high inertia long stroke main valve and a relatively low inertia short stroke pilot valve, ported guide means for slidably guiding said pilot valve during movement thereof, said ported guide means and said pilot valve together presenting passage means for the pressure fluid so constructed and arranged as to balance said pilot valve against tendency toward displacement thereof by the pressure fluid in all positions of movement of said pilot valve, means for effecting operation of said pilot valve comprising spring opposed solenoid means having an armature provided with a pilot valve operating portion so spaced from said pilot valve, when the latter is in its said one position, that movement of said armature portion will strike the pilot valve as an incident to moving said pilot valve, means responsive to spring operation of said pilot valve, when said solenoid is de-energized for causing pressure fluid delivered by said pump to act on said main valve to effect pressure fluid operation of said main valve, means responsive to the vehicle attaining a predetermined speed for effecting de-energization of said solenoid to cause pressure fluid operation of said motor, and means responsive to driver operation of said accelerator, when the vehicle speed is above that aforesaid, for effecting energization of said solenoid to cause venting of said motor.

14. In a power transmission for a motor vehicle of the type comprising change speed means for effecting step-up and step-down variation in the speed ratio drive through the transmission, a pressure fluid operated motor for controlling said change speed means, said motor comprising a casing structure formed with a cylinder providing a pressure fluid chamber, means carried by said casing structure provided with a guideway coaxial with said cylinder, a piston having a skirted portion slidably engaging the walls of said cylinder and adapted for pressure fluid induced movement, a rod in thrust receiving relationship with said piston and having an end portion slidably supported in said guideway, said change speed means comprising an element shiftable for controlling said variation in the transmission speed ratio drive, a relatively small force compression spring having one end thereof extending within the skirted portion of said piston for seating on said piston, the other end of said spring being disposed for transmitting thrust to said shiftable element whereby to move said element in one direction in response to pressure fluid operation of said piston, an abutment member carried within said cylinder, and a relatively large force compression spring coaxially surrounding said small force spring and extending between said abutment and said piston whereby to bias the piston for return movement when said motor is vented.

15. In a power transmission for a motor vehicle having an engine equipped with an accelerator controlled throttle and an ignition system, a driving shaft adapted to receive drive from the engine, a driven shaft adapted to drive the vehicle, change speed means for effecting step-up and step-down variation in the speed ratio drive through the transmission, a pressure fluid operated motor for controlling said change speed means, a pump operable to deliver fluid under pressure to said motor, valving means for so controlling said delivery of pressure fluid to said motor as to selectively effect fluid operation of and venting of said motor, a solenoid for controlling said valving means, an ignition controlling switch operably connected to the power element of said motor, a vehicle speed responsive switch, an accelerator controlled switch, a source of electrical energy, relay means comprising two sets of points connected so as to together open and close and a relay-solenoid for controlling opening and closing of said sets of points, circuit forming means leading from said energy source to said relay-solenoid and thence branching in parallel grounding paths respectively including said speed responsive and accelerator switches, circuit forming means leading from said energy source to one of said sets of relay points and thence in a grounding path including said solenoid, and an ignition grounding line for disabling said ignition system extending from said ignition system in series relationship with the other of said sets of relay points and said ignition controlling switch.

AUGUSTIN J. SYROVY.
TENO IAVELLI.

REFERENCES CITED

The following references are of record in the file of this patent:

UNITED STATES PATENTS

| Number | Name | Date |
|---|---|---|
| 2,024,687 | Farmer | Dec. 17, 1935 |
| 2,229,345 | Schotz | Jan. 21, 1941 |
| 2,333,668 | Neracher et al. | Nov. 9, 1943 |
| 2,348,763 | Syrovy et al. | May 16, 1944 |